(12) United States Patent
Neff

(10) Patent No.: US 7,808,988 B2
(45) Date of Patent: Oct. 5, 2010

(54) SYSTEM AND METHOD FOR CONNECTING MOBILE DEVICES

(75) Inventor: Ralph Neff, San Diego, CA (US)

(73) Assignee: Packet Video Corporation, San Diego, CA (US)

( * ) Notice: Subject to any disclaimer, the term of this patent is extended or adjusted under 35 U.S.C. 154(b) by 794 days.

(21) Appl. No.: 11/704,054

(22) Filed: Feb. 8, 2007

(65) Prior Publication Data

US 2007/0189275 A1 Aug. 16, 2007

Related U.S. Application Data

(60) Provisional application No. 60/772,161, filed on Feb. 10, 2006.

(51) Int. Cl.
*H04L 12/28* (2006.01)
*H04L 12/66* (2006.01)
*H04J 3/16* (2006.01)
*H04J 3/22* (2006.01)
*H04B 7/00* (2006.01)

(52) U.S. Cl. ........................ 370/389; 370/352; 370/465; 455/517

(58) Field of Classification Search ......... 370/229–264, 370/310–395, 431–468; 455/432–517; 709/218–246
See application file for complete search history.

(56) References Cited

U.S. PATENT DOCUMENTS 6,108,560 A * 8/2000 Navaro et al. ............... 455/517

(Continued)

FOREIGN PATENT DOCUMENTS

EP 1 079 573 2/2001

(Continued)

OTHER PUBLICATIONS

PCT Written Opinion, Jan. 14, 2008, Neff.

(Continued)

*Primary Examiner*—M. Phan
(74) *Attorney, Agent, or Firm*—Patents + TMS, P.C.

(57) ABSTRACT

A system and a method connect mobile devices via channels which connect a first terminal and a second terminal. A bearer establishment of the connection is identified by the first terminal and/or the second terminal. The first terminal accesses information to identify the second terminal and/or to select a first codec for data to transmit the data in the first codec between the terminals. The first terminal alternatively chooses a first codec without accessing the information. The data in the first codec is transmitted from the first terminal to the second terminal without an exchange of codec capabilities and/or codec preferences. The second terminal is capable of receiving the data sent in the first codec. Alternatively, the second terminal may be incapable of receiving the data sent in the first codec. The first terminal uses capability and/or preference information received from the second terminal to detect cases whether the second terminal is incapable of receiving the data in the first codec. The first terminal identifies a second codec for the data which is acceptable by the second terminal for receiving the data. The first terminal changes from transmitting the data in the first codec to transmitting the data in the second codec. The second terminal receives and/or accepts the data sent in the second codec. The capability information and/or the preference information of the second terminal is stored in the first terminal and/or in a database accessible by the first terminal.

35 Claims, 4 Drawing Sheets

U.S. PATENT DOCUMENTS

| | | | |
|---|---|---|---|
| 6,167,092 A | 12/2000 | Lengwehasatit | |
| 6,498,865 B1 | 12/2002 | Brailean et al. | |
| 6,529,552 B1 | 3/2003 | Tsai et al. | |
| 6,597,702 B1* | 7/2003 | Caugherty | 370/410 |
| 6,603,774 B1* | 8/2003 | Knappe et al. | 370/466 |
| 6,804,717 B1 | 10/2004 | Bakshi et al. | |
| 7,006,631 B1 | 2/2006 | Luttrell | |
| 7,139,279 B2 | 11/2006 | Jabri et al. | |
| 7,257,130 B2* | 8/2007 | Sirbu | 370/465 |
| 7,443,879 B2* | 10/2008 | Ejzak et al. | 370/465 |
| 2002/0002044 A1 | 1/2002 | Naruse et al. | |
| 2003/0048855 A1 | 3/2003 | Klaghofer et al. | |
| 2003/0067872 A1 | 4/2003 | Harrell et al. | |
| 2003/0093267 A1 | 5/2003 | Leichtling et al. | |
| 2003/0142744 A1 | 7/2003 | Wu et al. | |
| 2003/0219006 A1* | 11/2003 | Har | 370/352 |
| 2004/0077313 A1 | 4/2004 | Oba et al. | |
| 2004/0158645 A1 | 8/2004 | Morinaga et al. | |
| 2004/0174817 A1 | 9/2004 | Jabri et al. | |
| 2004/0193762 A1 | 9/2004 | Leon et al. | |
| 2004/0218673 A1 | 11/2004 | Wang et al. | |
| 2005/0008030 A1 | 1/2005 | Hoffmann et al. | |
| 2005/0041578 A1* | 2/2005 | Huotari et al. | 370/229 |
| 2006/0013148 A1 | 1/2006 | Burman et al. | |
| 2006/0029041 A1 | 2/2006 | Jabri et al. | |
| 2006/0056416 A1 | 3/2006 | Yang et al. | |
| 2006/0159037 A1* | 7/2006 | Jabri et al. | 370/310 |
| 2006/0176877 A1 | 8/2006 | Jabri et al. | |
| 2007/0011277 A1* | 1/2007 | Neff et al. | 709/218 |
| 2007/0076756 A1 | 4/2007 | Chan et al. | |
| 2007/0112935 A1 | 5/2007 | Espelien | |
| 2007/0156770 A1 | 7/2007 | Espelien | |
| 2007/0171841 A1* | 7/2007 | Witzel et al. | 370/254 |
| 2007/0186003 A1 | 8/2007 | Foster et al. | |
| 2007/0189275 A1 | 8/2007 | Neff | |
| 2007/0220555 A1 | 9/2007 | Espelien | |
| 2007/0226315 A1 | 9/2007 | Espelien | |
| 2007/0233701 A1 | 10/2007 | Sherwood et al. | |
| 2007/0245399 A1 | 10/2007 | Espelien | |
| 2007/0276864 A1 | 11/2007 | Espelien | |
| 2007/0297352 A1* | 12/2007 | Jabri et al. | 370/261 |

FOREIGN PATENT DOCUMENTS

| | | |
|---|---|---|
| WO | WO 2004/064353 | 7/2004 |
| WO | WO 2007/095071 | 8/2007 |

OTHER PUBLICATIONS

PCT Search Report, Jan. 14, 2008, Neff.

* cited by examiner

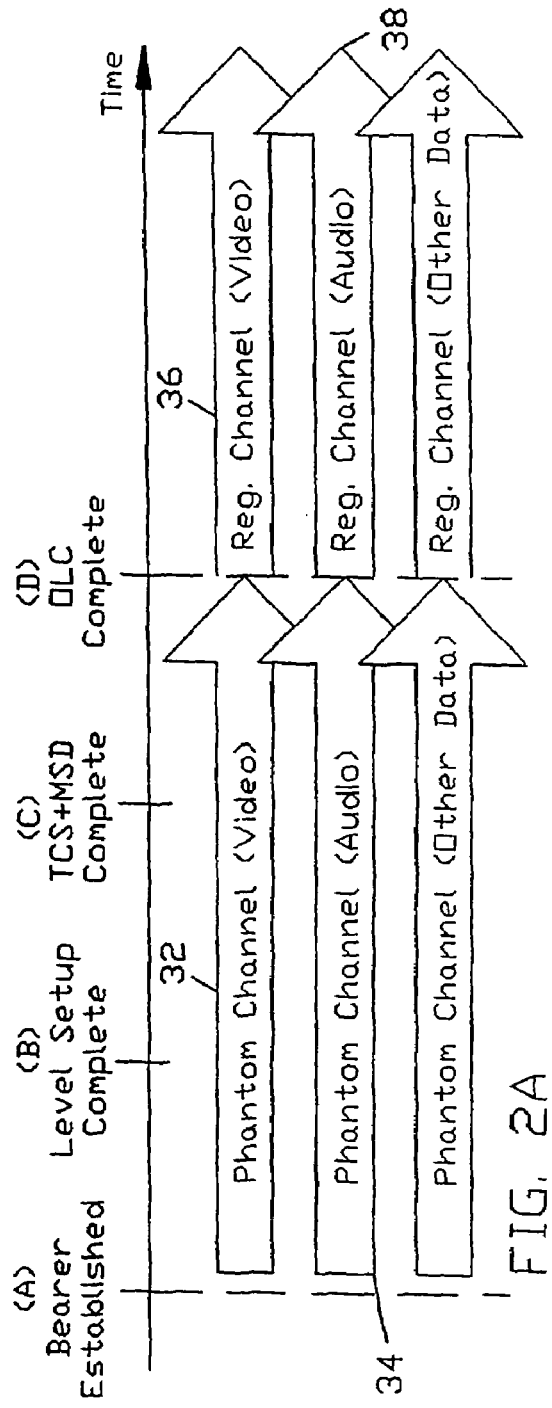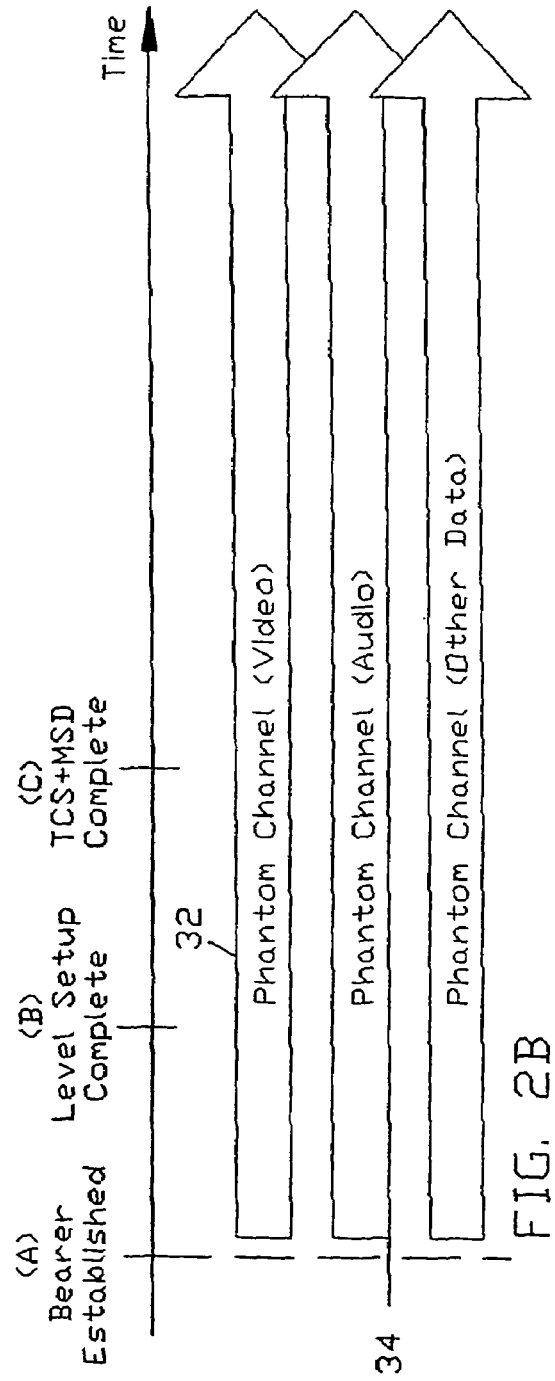
FIG. 2A
FIG. 2B

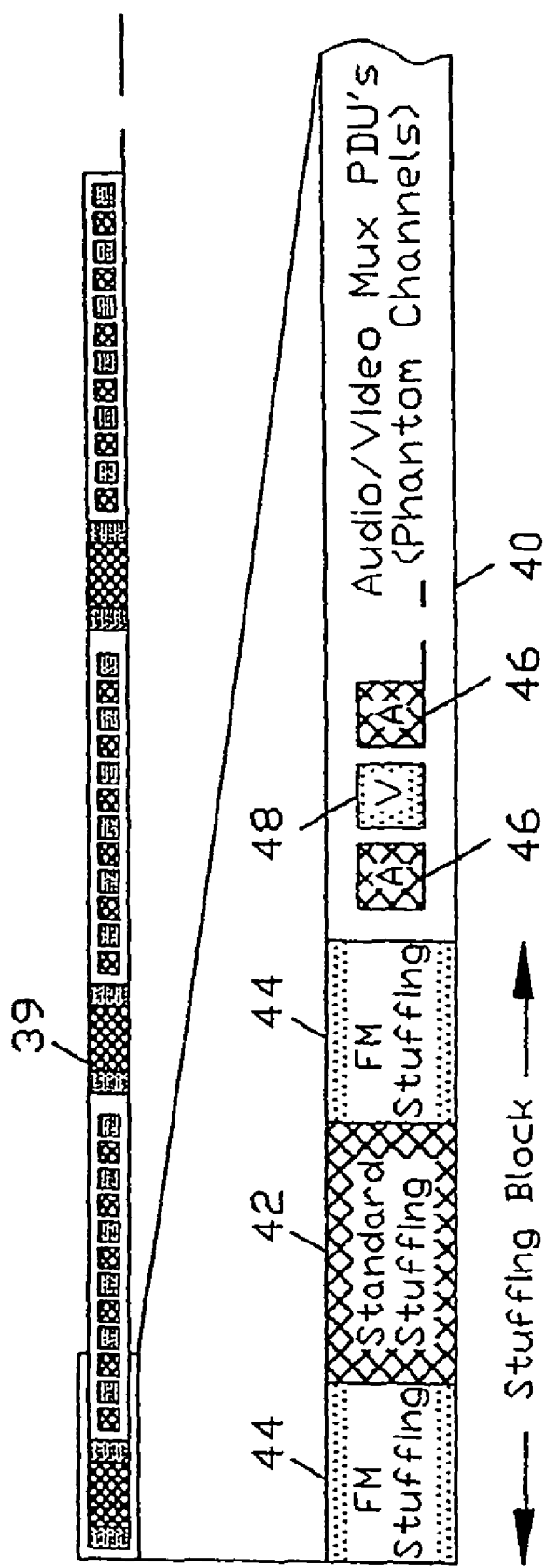

SYSTEM AND METHOD FOR CONNECTING MOBILE DEVICES

This application claims the benefit of U.S. Provisional Application Ser. No. 60/772,161, filed Feb. 10, 2006.

BACKGROUND OF THE INVENTION

The present invention generally relates to a system and a method for connecting mobile devices. More specifically, the present invention relates to a system and a method for connecting mobile devices which may transmit data between a first terminal and a second terminal. The first terminal may determine and/or may recognize an identification of the second terminal based on information of a database which may be connectable to the first terminal. The identification of the second terminal may enable and/or may permit the first terminal to establish and/or to open a connection between the first terminal and the second terminal. The first terminal may transfer and/or may transmit the data in a first codec to the second terminal. The first terminal may select the first codec based on the identification of the second terminal and/or based on information associated with the second terminal which is stored in the database. The database may store information about capabilities and/or preferences of the second terminal, and such information may be used by the first terminal to recognize and/or to determine the first codec which may be acceptable and/or may be receivable by the second terminal. As a result, the second terminal may receive, may accept, may process and/or may display the data in the first codec which may be transmitted from the first terminal via the connection.

Alternatively the first terminal may be incapable of identifying the second terminal, or the database may not include capability information and/or preference information associated with the second terminal. The first terminal may in such cases select the first codec without using information from the database.

In an embodiment of the present invention, the second terminal may not be capable of receiving, of processing and/or of accepting the data in the first codec. An exchange of capabilities and/or of preferences of the first terminal and of the second terminal may be transferred and/or may be transmitted between the first terminal and the second terminal. The first terminal may determine and/or may identify a second codec which may be acceptable by the second terminal for receiving, for processing and/or for displaying the data received from the first terminal. The second codec may be determined by, may be associated with, may be identified from, and/or may correspond to the exchange of capabilities and/or of preferences of the second terminal. The data in the second codec may be received by, may be processed by, may be accepted and/or may be displayed by the second terminal from the first terminal via the connection. As a result, a call setup between the first terminal and the second terminal may be established and/or may be opened via the connection for transferring the data in the first codec or in the second codec. Moreover, the second codec of the second terminal and/or the capabilities and/or the preferences of the second terminal may be stored in the database of the first terminal.

It is generally known, for example, that mobile devices, such as, for example, a first terminal and a second terminal may conduct a video conference to communicate and/or to transmit multimedia or data between the first terminal and the second terminal via 3G-324M standard protocol. The multimedia and/or the data may consist of audio, video, and/or other types of data. Traditionally, the 3G-324M protocol enabled terminals may be, for example, a 3G mobile telephone, a personal digital assistant (hereinafter "PDA"), a laptop computer and/or the like. The first terminal may transmit the multimedia or the data in one or more codec formats to a second terminal during the video conference and/or data exchange. Prior to transmitting the multimedia and/or the data between the terminal, a terminal capability set (hereinafter "TCS") message must be transmitted between the terminals to identify a version of a control protocol, such as, for example, H.245 which is acceptable to and/or is used by each terminal and/or to identify capabilities of each terminal. As a result, the terminals determine which codec or codecs may be acceptable by both terminals to transmit, to transfer, to receive, to accept, to process and/or to display the multimedia and/or the data by the first terminal and/or the second terminal.

A master/slave determination (hereinafter "MSD") message must also be exchanged between the terminals prior to transmission of the multimedia and/or the data between the terminals. Information in the MSD message is used for a subsequent channel negotiation to determine which codec or codecs will be used and/or are acceptable to transmit and/or to transfer the multimedia and/or the data between the terminals. A transmission channel, such as, for example, an open logical channel (hereinafter "OLC") is established between the terminals after the first terminal receives and/or processes the TCS message and the MSD message from the second terminal. As a result, the multimedia and/or the data in the codec or in the codecs is transmitted between the terminals via the transmission channel using the codec and/or the codecs which are acceptable by each terminal as identified in and/or as determined by the TCS message and/or the MSD message.

However, the first terminal will not transmit the multimedia and/or the data to the second terminal without receiving the TCS message and the MSD message from the second terminal. The transmission channel between the terminals will not be established and/or will not be opened until the first terminal receives, accepts and/or processes the TCS message and the MSD message from the second terminal. Moreover, a duration of a setup time to begin transmission of the multimedia and/or the data between the terminals is extended by and/or is based on durations of times for transmitting the TCS message and the MSD message between the terminals and/or for negotiating and establishing the transmission channel between the terminals. An initial exchange of capabilities and intents commonly used by the terminals result in a lengthy call setup period before the multimedia, and the data may be exchanged between the terminals via the transmission channel.

A need, therefore, exists for a system and a method for connecting mobile devices. Additionally, a need exists for a system and a method for connecting mobile devices which may transmit data between the mobile devices prior to communicating capabilities, preferences and/or other messages between the mobile devices for identifying an acceptable codec for the data. Further, a need exists for a system and a method for connecting mobile devices which may have a database with information corresponding to and/or associated with the mobile devices to determine a first codec for transmitting data between the mobile devices. Still further, a need exists for a system and a method for connecting mobile devices which may identify the mobile devices based on information in a database to determine a first codec for transmitting data between the mobile devices. Moreover, a need exists for a system and a method for connecting mobile devices which may detect when data transmitted in a first codec is not acceptable to the receiving terminal for switching the transmission of data to a second codec acceptable to the receiving terminal. Furthermore, a need exists for a system and a method for connecting mobile devices which may establish and/or may open a transmission channel between the mobile devices for transmitting data in one or more codecs via information in a database of one of the mobile devices. Additionally, a need exists for a system and a method for connecting mobile devices which may store information about capabilities and preferences of a remote terminal received during call setup and/or the like in a database for use in future communication attempts and/or in connection attempts. Further, a need exists for a system and a method for connecting mobile devices which may minimize and/or may reduce a duration of call setup time expended by the mobile devices prior to and/or during transmission of data between the mobile devices via information in a database of one or both of the mobile devices.

SUMMARY OF THE INVENTION

The present invention relates to a system and a method for connecting mobile devices. More specifically, the present invention relates to a system and a method for connecting mobile devices which may have a first terminal and/or a second terminal for transmitting data in a first codec or a second codec between the terminals. The first terminal and/or the second terminal may have and/or may be connected to a database with contact information and associated capability and/or preference information which may correspond to, may be associated with and/or may be based on the first terminal and/or the second terminal. The first terminal may access the contact information from the database to determine whether the database contains capability and/or preference information relevant to the second terminal. The first terminal may access the capability and/or preference information contained in the database to determine a first codec which the second terminal may be capable of accepting, of receiving, of processing and/or of displaying. Alternatively, the first terminal may be unable to identify the second terminal or to find the capability and/or the preference information associated with the second terminal in the database. As a result, the first terminal may select the first codec without making use of the information from the database. A connection between the terminals may be established which may have one or more transmission channels for transmitting the data in the first codec between the terminals. Without receiving capabilities of and/or intentions from the second terminal, the first terminal may transmit the data in the first codec to the second terminal over one of the transmission channels. As a result, the second terminal may receive, may process, may accept and/or may display the data in the first codec.

Alternatively, the second terminal may be incapable of receiving, of processing, of accepting and/or of displaying the data in the first codec. The first terminal may exchange capabilities and/or preferences with the second terminal. The first terminal may use the exchanged capability and/or preference information to discover whether the second terminal is incapable of receiving, of processing, of accepting and/or of displaying the data in the first codec. As a result, the first terminal may switch to and/or may change from transmitting the data in the first codec to a second codec which may be acceptable to the second terminal for receiving, for processing, for accepting and/or for displaying the data. The first terminal may update the database with information about the identification of, the capabilities of, the preferences of, and/or a success or a failure of codec connections to the second terminal.

In an embodiment of the present invention, a system is provided for transmitting data wherein the data is audio signals, video signals or accelerated control negotiation protocol signals. The system has a wireless network that transmits the data; a first terminal connected to the network wherein the first terminal receives and transmits the data via the network; and a second terminal connected to the network wherein the second terminal communicates with the first terminal via the network. The system has a first database accessible by the first terminal wherein the first database has a plurality of codecs and associated codec configuration information wherein the database stores an association of the second terminal with a first codec wherein the first terminal provides an identification of the second terminal, uses the identification to select the first codec from the first database and transmits the data in the first codec to the second terminal via the network.

In an embodiment, the second terminal displays the data in the first codec.

In an embodiment, the system has a channel established between the first terminal and the second terminal wherein the channel is associated with the first codec wherein the data is transmitted via the channel.

In an embodiment, the first terminal receives a codec capability of the second terminal with a second codec and stores in the first database an association of the codec capability with the second terminal.

In an embodiment, the first terminal uses information entered by a user to provide the identification of the second terminal.

In an embodiment, the first terminal uses a database of contact information to provide the identification of the second terminal.

In an embodiment, the first terminal uses a caller identification service provided by the network to provide the identification of the second terminal.

In an embodiment, a transmission from the second terminal to the first terminal conveys that the second terminal is not capable of receiving data in the first codec.

In an embodiment, the system has a message transmitted from the second terminal to the first terminal wherein the message switches the data transmission from the first codec to the second codec.

In an embodiment, the network is wireless.

In another embodiment, a system is provided for transmitting data wherein the data is audio signals, video signals or accelerated control negotiation protocol signals. The system has a network that transmits the data; a first terminal connected to the network wherein the first terminal receives and transmits the data via the wireless network; and a second terminal connected to the wireless network wherein the second terminal communicates with the first terminal via the network. The system has a plurality of codecs wherein the first terminal selects a default codec from the plurality of codecs without identifying codec capabilities of the second terminal and transmits the data in the default codec to the second terminal via the network.

In an embodiment, the system has a database accessible by the first terminal wherein the first terminal receives a codec capability of the second terminal with a second codec and stores an association of the codec capability with the second terminal in the database.

In an embodiment, the system has a first channel established between the first terminal and the second terminal wherein the first channel is associated with the default codec wherein a message from the second terminal to the first terminal provides an acceptable codec associated with a second channel.

In an embodiment, the default codec is a predicted codec based on information entered by a user.

In another embodiment, a method is provided for transmitting data wherein the data is audio signals, video signals or accelerated control negotiation protocol, the method comprising the steps of: connecting a first terminal and a second terminal wherein the first terminal and the second terminal communicate via a network; assigning a code to each of a plurality of codecs wherein the code assigned to a first codec is different than the code assigned to a second codec wherein each codec of the plurality of codecs corresponds to a potential codec capability of the second terminal; establishing a connection between the first terminal and the second terminal over the network wherein a channel is opened between the first terminal and the second terminal via the connection wherein the data is transmitted between the first terminal and the second terminal via the channel before the first terminal has received codec capabilities transmitted from the second terminal to the second terminal; and transmitting the data from the first terminal to the second terminal via the channel wherein the data is transmitted in the first codec wherein the first terminal makes an identification of the second terminal wherein the first terminal selects the first codec from the plurality of codecs based on the identification wherein the first codec corresponds to a known codec capability of the second terminal.

In another embodiment, the method further comprises the step of identifying the codec capability of the second terminal wherein the codec capability of the second terminal is stored in a database accessible by the first terminal.

In another embodiment, the method further comprises the step of transmitting a message from the first terminal to the second terminal with data in the first codec wherein the second terminal uses the message to provide a codec capability of the first terminal with at least one of the plurality of codecs.

In another embodiment, the method further comprises the step of switching the data from the first codec to a second codec wherein the first terminal transmits the data in the second codec to the second terminal.

In another embodiment, the method further comprises the step of arranging the plurality of codecs into a chart accessible by the first terminal and the second terminal.

It is, therefore, an advantage of the present invention to provide a system and a method for connecting mobile devices which may provide a first terminal for transmitting data to a second terminal without receiving capabilities of and/or intentions from the second terminal.

Another advantage of the present invention is to provide a system and a method for connecting mobile devices which may transmit data in a first codec and/or in a second codec between a first terminal and a second terminal.

And, another advantage of the present invention is to provide a system and a method for connecting mobile devices which may transmit an abstract syntax notation message to relay a codec capability and/or a codec preference of a first terminal and/or a second terminal.

A further advantage of the present invention is to provide a system and a method for connecting mobile devices which may embed capability structures of control protocol into a message to indicate a codec capability and/or a codec preference of a first terminal and/or a second terminal.

Moreover, an advantage of the present invention is to provide a system and a method for connecting mobile devices which may send and/or may transmit data from a first terminal to a second terminal without completing an H.245 logical channel negotiation between the first terminal and the second terminal.

And, another advantage of the present invention is to provide a system and a method for connecting mobile devices which may provide a terminal capability set and/or a master/slave determination to identify and/or to determine a second codec to be used where the first codec may be inappropriate for transmitting data between the first terminal and the second terminal.

Yet another advantage of the present invention is to provide a system and a method for connecting mobile devices which may send and/or may transmit data from a first terminal to a second terminal without completing a H.245 logical channel negotiation between the first terminal and the second terminal.

Another advantage of the present invention is to provide a system and a method for connecting mobile devices which may utilize standard H.245 negotiation, improved H.245 negotiation methods, such as, for example, WNSRP and/or other enhanced channel negotiation methods to determine a second codec for the data when the first codec may be inappropriate for transmitting data between the terminals.

A still further advantage of the present invention is to provide a system and a method for connecting mobile devices which may utilize one or more transmission channels to transfer, to transmit and/or to send data between a first terminal and a second terminal.

Moreover, an advantage of the present invention is to provide a system and a method for connecting mobile devices which may determine a codec of data that may be acceptable by a first terminal and/or a second terminal based on information in a database accessible by and/or stored in the first terminal and/or the second terminal.

And, another advantage of the present invention is to provide a system and a method for connecting mobile devices which may identify a second terminal based on contact information stored in the database of a first terminal for determining an initial codec of data to transmit to the second terminal from the first terminal.

Yet another advantage of the present invention is to provide a system and a method for connecting mobile devices which may transmit, may send and/or may transfer data between a first terminal and a second terminal upon establishment of a bearer between the terminals.

Moreover, an advantage of the present invention is to provide a system and a method for connecting mobile devices which may provide a first terminal and/or a second terminal to support one or more of an adaptive multi-rate codec, an adaptive multi-rate wide-band codec, an adaptive multi-rate wide-band plus codec, an H.263 codec, an H.264 codec and a moving picture experts group four visual codec (hereinafter "MPEG-4").

And, another advantage of the present invention is to provide a system and a method for connecting mobile devices in which a first terminal may identify a second terminal via a code corresponding to and/or associated with the second terminal in order to determine a codec for transmitting data between the first terminal and the second terminal.

Yet another advantage of the present invention is to provide a system and a method for connecting mobile devices which may provide a database for storing and retrieving contact information, capability information and/or preference information corresponding to and/or associated with a first terminal and/or a second terminal to determine a codec for transmitting data between the first terminal and/or the second terminal.

Another advantage of the present invention is to provide a system and a method for connecting mobile devices which may provide a default codec which may be used to transmit data between a first terminal and a second terminal in cases where relevant contact information, capability information and/or preference information may not be available in a connected database.

And, another advantage of the present invention is to provide a system and a method for connecting mobile devices which may access contact information associated with a second terminal to determine and/or to identify a codec for transmitting data from a first terminal to the second terminal.

Yet another advantage of the present invention is to provide a system and a method for connecting mobile devices which may establish and/or may open a transmission channel between the mobile devices after determining a codec for transmitting data between the mobile devices.

A further advantage of the present invention is to provide a system and a method for connecting mobile devices which may provide one or more channels based on contact information of the mobile devices to connect the mobile devices for transmitting data in a codec between the mobile devices.

Moreover, an advantage of the present invention is to provide a system and a method for connecting mobile device which may change and/or may switch from transmitting data in a first codec to transmitting the data in a second codec based on capability information and/or preference information exchanged between the mobile devices.

And, another advantage of the present invention is to provide a system and a method for connecting mobile devices which may receive, may exchange and/or may store capability information, preference information, and/or information about acceptable codecs, so that such information may be used in the codec selection, codec negotiation, and/or call setup procedures of future calls.

Yet another advantage of the present invention is to provide a system and a method for connecting mobile devices which may provide a standard combination of universally acceptable codecs for transmitting data between the mobile devices without the need for exchange of capabilities and/or preferences.

Additional features and advantages of the present invention are described in, and will be apparent from, the detailed description of the presently preferred embodiments and from the drawings.

BRIEF DESCRIPTION OF THE DRAWINGS

FIG. 2A illustrates a time-line to transmit data for connecting mobile devices in an embodiment of the present invention.

FIG. 2B illustrates a time-line to transmit data for connecting mobile devices in an embodiment of the present invention.

FIG. 3 illustrates a transmission of data for connecting mobile devices in an embodiment of the present invention.

DETAILED DESCRIPTION OF THE PREFERRED EMBODIMENTS

The present invention relates to a system and a method for connecting mobile devices which may have a connection of one or more channels to connect a first terminal and a second terminal. An establishment of a bearer connection may be identified by the first terminal and/or the second terminal. The first terminal may be capable of identifying the second terminal. The first terminal may use the identification of the second terminal to access stored information about the capabilities and/or the preferences of the second terminal. The first terminal may use information which may be stored to determine and/or to choose a first codec for data to transmit the data in the first codec from the first terminal to the second terminal. Alternatively, the first terminal may not be capable of identifying the second terminal, or may not have access to stored information associated with the capabilities and the preferences of the second terminal. As a result, the first terminal may determine and/or may choose the first codec without a benefit of the information stored.

The data in the first codec may be transmitted, may be transferred, may be sent between the first terminal and the second terminal upon establishment of the bearer without an exchange of codec capabilities and/or of codec preferences of the terminals. The second terminal may be capable of receiving, of accepting, of processing, and/or of displaying the data in the first codec. Alternatively, the second terminal may not be capable of receiving, of accepting, of processing, and/or of displaying the data in the first codec. The first terminal and/or the second terminal may exchange the capabilities and/or the preferences. The first terminal may use the capability information and/or the preference information which may be received from the second terminal to detect whether the second terminal may not be capable of receiving, of accepting, of processing, and/or of displaying the data in the first codec. The first terminal may use the capability information and/or the preference information which may be received from the second terminal to select a second codec which the second terminal may be capable of receiving, of accepting, of processing, and/or of displaying. The first terminal may transfer from, may alter from and/or may change from transmitting the data in the first codec to transmitting the data in the second codec to the second terminal. As a result, the second terminal may accept, may receive, may process, may render and/or may display the data in the second codec. The first terminal may store information relating to the identification of, the capabilities of, the preferences of and/or the success or the failure of specific codec transmissions to the second terminal. The first terminal may store, may access and/or may retrieve the information using a database and/or the like.

Figures 1, 4:
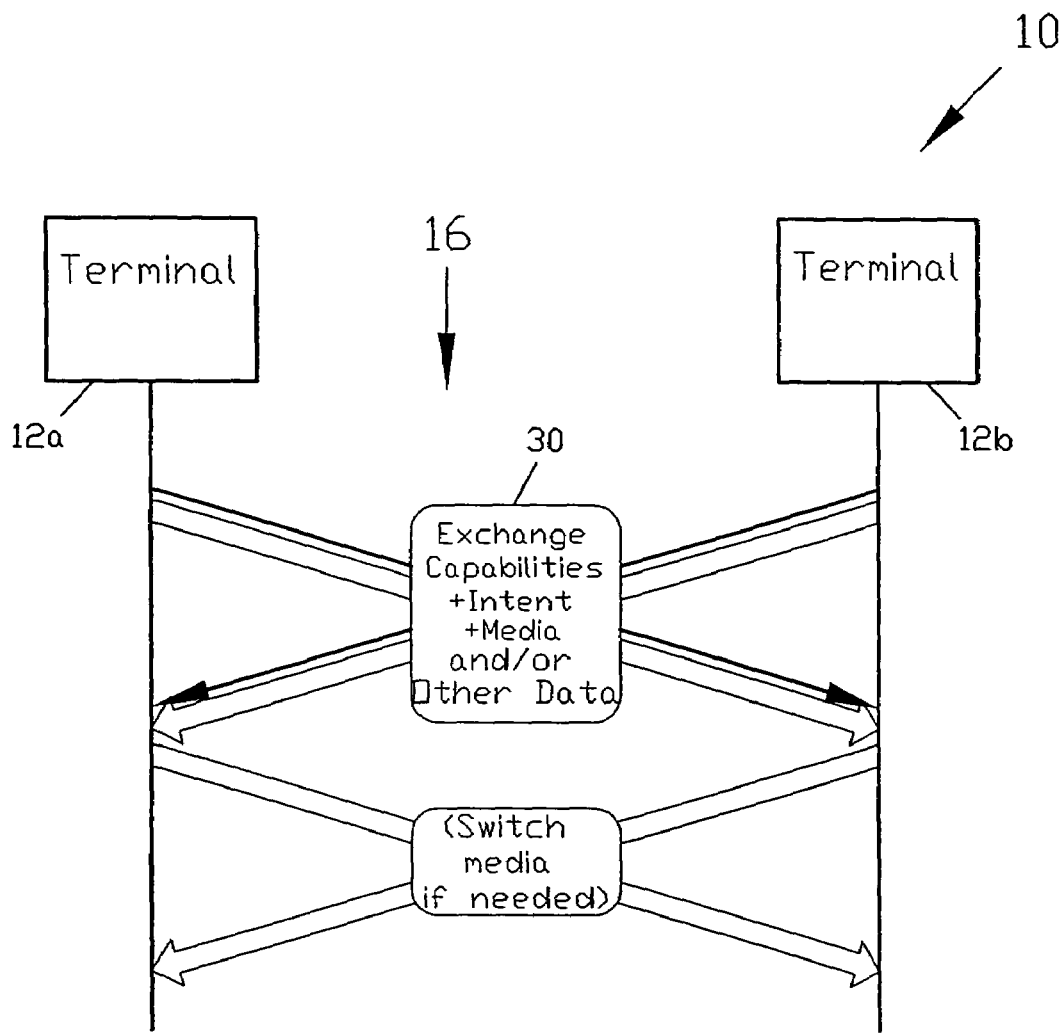
FIG. 1 illustrates an information exchange used by a system for connecting mobile devices in an embodiment of the present invention.
FIG. 4 illustrates a table of codecs of a system for connecting mobile devices in an embodiment of the present invention.
Figure 5:
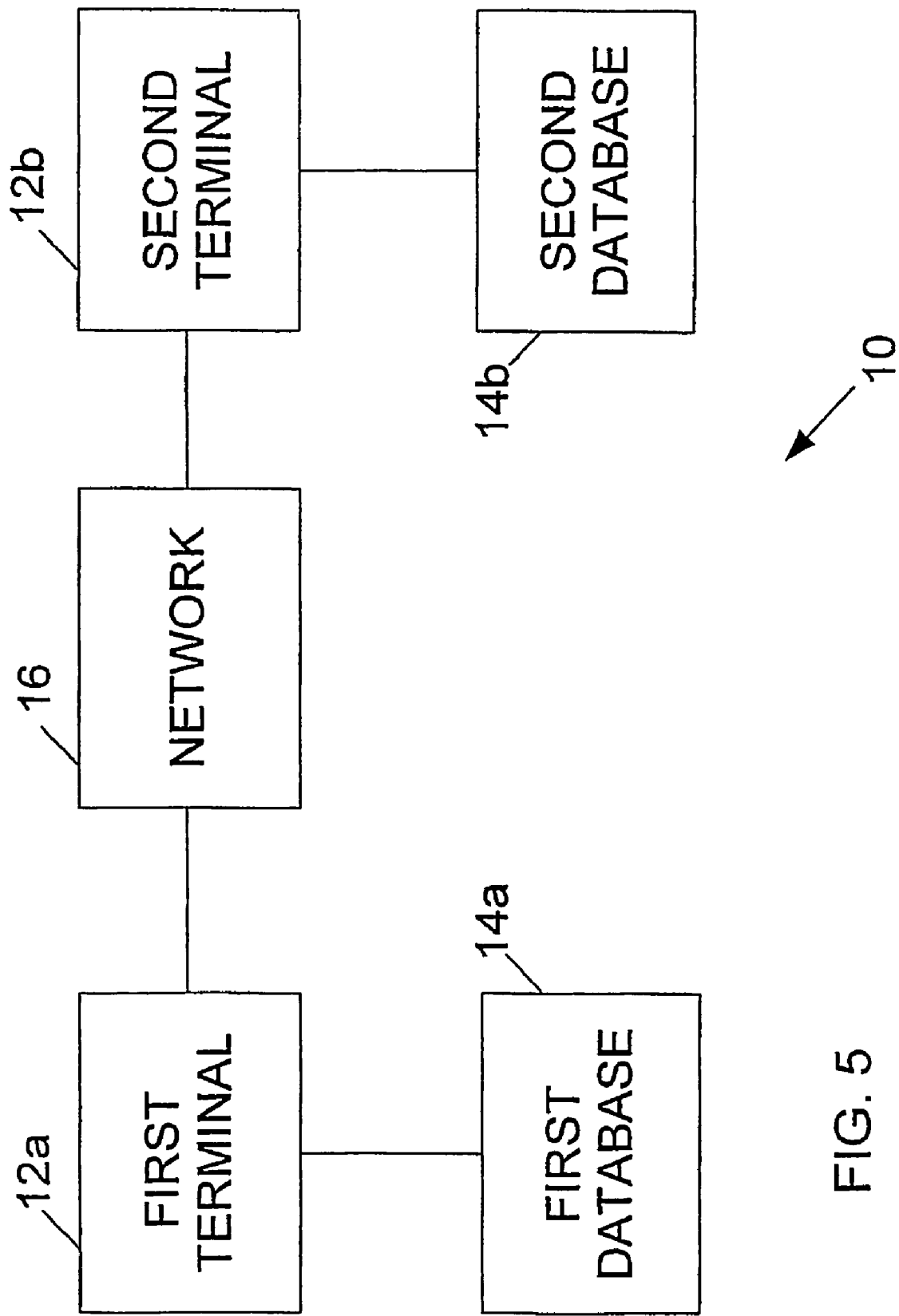
FIG. 5 illustrates a system for connecting mobile devices in an embodiment of the present invention.

Referring now to the drawings wherein like numerals refer to like parts, FIGS. 1 and 5 illustrate a system 10 which may have a first terminal 12a and/or a second terminal 12b for transferring, for sending and/or for transmitting data between the terminals 12a, 12b. The data may be, for example, an audio signal, a video signal, a data stream, an accelerated control negotiation protocol and/or the like. The first terminal 12a may be connected to and/or may be in communication with the second terminal 12b. The first terminal 12a and/or the second terminal 12b may be, for example, a computer terminal, a mobile device and/or an electronic device which may be capable of transmitting, of receiving, of processing, of accepting and/or of displaying the data formatted in a first codec. Further, the mobile device may be, for example, a 4G mobile device, a 3G mobile device, an internet protocol (hereinafter "IP") video cellular telephone, a PDA, a laptop computer, a mobile cellular telephone, a portable digital audio player, a portable digital video player and/or the like. The present invention should not be deemed as limited to a specific embodiment of the data and/or a specific embodiment of the mobile device of the first terminal 12a and/or the second terminal 12*b*. It should be understood that the first terminal 12*a* and/or the second terminal 12*b* may be any terminal capable of transmitting, capable of receiving, capable of rendering, capable of processing the data and/or capable of displaying the data as known to one having ordinary skill in the art.

The first terminal 12*a* and/or the second terminal 12*b* may conduct, may render, may open and/or may transmit a video conference, an audio communication and/or an audio-visual communication on a data communication network 16 (hereinafter, "the network 16") as shown in FIGS. 1 and 5. The video conference, the audio communication and/or the audio-visual communication may be established, may be conducted, may be rendered, may be opened and/or may be completed via a transmission protocol, such as, for example, an H.320 protocol, an H.323 protocol, an H.324 protocol and/or a 3G-324M protocol. The first terminal 12*a* and/or the second terminal 12*b* may transmit, may deliver, may receive and/or may process a control/transmission message 30 in a control protocol, such as, for example, an H.245 protocol over the network 16 as shown in FIG. 1. The network 16 may have one or more channels connecting the first terminal 12*a* and the second terminal 12*b* for transmitting the data between the terminals 12*a*, 12*b*. The data may be transmitted between, may be received by, may be processed by, may be rendered and/or may be displayed by the first terminal 12*a* and the second terminal 12*b* via one or more channels of the network 16. The present invention should not be deemed as limited to a specific embodiment of the transmission protocol and/or a specific embodiment of the control protocol of the system 10.

The control/transmission message 30 may control, may render, may open and/or may close one or more logical channels for transmitting, for communicating and/or for transferring the data between the first terminal 12*a* and the second terminal 12*b*. The control/transmission message 30 may indicate, may determine and/or may identify one or more codec capabilities, codec preferences and/or intentions of the first terminal 12*a* and/or the second terminal 12*b*. The first terminal 12*a* and/or the second terminal 12*b* may utilize a retransmission protocol, for example, a WNSRP protocol and/or the like for delivering and/or for accepting the control/transmission messages 30 over the network 16. The retransmission protocol may permit more than one control/transmission message 30 to be delivered to the first terminal 12*a* and/or the second terminal 12*b* without an acknowledgment of the control/transmission message 30 from the first terminal 12*a* and/or the second terminal 12*b*, respectively. The present invention should not be deemed as limited to a specific embodiment of the retransmission protocol of the system 10.

The first terminal 12*a* and/or the second terminal 12*b* of the system 10 may represent, may transmit, may render, may encode and/or may decode the data and/or information in an abstract syntax, such as, for example, an abstract syntax notation one (hereinafter "ASN.1"). The data and/or information in the control/transmission message 30 may be represented in, may be transmitted in, may be rendered by, may be encoded with, and/or may be decoded with the abstract syntax. The first terminal 12*a* and/or the second terminal 12*b* may utilize the control/transmission message 30 in ASN.1 to relay, to identify and/or to determine the codec capabilities and/or the codec preferences of first terminal 12*a* and/or of the second terminal 12*b*. The present invention should not be deemed as limited to a specific embodiment of the abstract syntax of the system 10.

As illustrated in FIG. 1, the first terminal 12*a* and/or the second terminal 12*b* in system 10 may begin to transmit the data upon establishment of a bearer connection to connect the first terminal 12*a* and the second terminal 12*b* via the network 16. The transmission of media and/or other data may be started without completing an exchange of capabilities information and/or intent information between the first terminal 12*a* and the second terminal 12*b*. The control/transmission message 30 of the system 10 may allow, may permit, may open, may render and/or may establish the transmission of media and/or other data between the first terminal 12*a* and the second terminal 12*b*. The transmission of media and/or other data may begin before, may begin after, or may begin concurrently with the transmission of the capabilities information and/or the intent information. As a result, media and/or other data may be transferred from the first terminal 12*a* to the second terminal 12*b* prior to, during or after the first terminal 12*a* receives the transmission of the capabilities information and/or the intent information from the second terminal 12*b*.

A first code and/or a second code may be assigned to, may be associated with, may correspond to and/or may be based on the first terminal 12*a* and/or the second terminal 12*b*. The first code and/or the second code may be, for example, a name, a number, a symbol, a series of numbers, letters and/or symbols, a telephone number, a word, an identification code, a tel URL, A SIP URL and/or the like. The first terminal 12*a* and/or the second terminal 12*b* may be identified by, may be located by, may be recognized and/or may be accessed via the first code and/or the second code, respectively. The first terminal 12*a* may access, may connect to, may be in communication with, may locate and/or may identify the second terminal 12*b* via the second code and/or the network 16. Moreover, the second terminal 12*b* may access, may connect to, may be in communication with, may locate and/or may identify the first terminal 12*a* via the first code and/or the network 16. It should be understood that the first code and/or the second code may be any code and/or may be any codes as known to one of ordinary skill in the art.

The first terminal 12*a* and/or the second terminal 12*b* may be connected to, may have, may access and/or may be in communication with a first database 14*a* and/or a second database 14*b*, respectively, as illustrated in FIG. 5. The first database 14*a* and/or the second database 14*b* may store, may access and/or may contain first information and/or second information, respectively, which may be accessible, may be identified by and/or may be utilized by the first terminal 12*a* and/or the second terminal 12*b*, respectively. Moreover, the first database 14*a* may be connected to, may be in communication with and/or may be accessible by the second database 14*b* via the terminals 12*a*, 12*b* and/or the network 16. Alternatively, the first information and/or the second information may be stored in, may be accessed from and/or may be received from the first terminal 12*a* and/or the second terminal 12*b*, respectively.

The first information and/or the second information may be based on, may correspond to and/or may be associated with, for example, the transmission of capabilities and intent information for, the codec capabilities of, the codec preferences of, the control/transmission message 30 from, contact information of and/or the intentions of the first terminal 12*a* and/or the second terminal 12*b*, respectively. The contact information of the first terminal 12*a* and/or of the second terminal 12*b* may be based on, may be associated with and/or may correspond to, for example, a service carrier of, a user plan of, the account number of, a billing address for, a location of, and/or the name and/or nickname of the owner and/or user of the first terminal 12*a* and/or the second terminal 12*b*, respectively. Moreover, the contact information of the first terminal 12*a* and/or the second terminal 12*b* may be based on, may be associated with, may correspond to and/or may have the first code and/or the second code, respectively. The present invention should not be limited to a specific embodiment of the contact information, of the first information and/or of the second information in the system 10.

The first terminal 12*a* may be connected to and/or may be in communication with the second terminal 12*b* to receive, to determine, to identify and/or to accept the second information from the second terminal 12*b*. As a result, the first terminal 12*a* may store the second information of, the contact information of and/or the second code of the second terminal 12*b* in the first database 14*a*. Further, the second terminal 12*b* may receive, may determine, may identify, may accept and/or may store the first information of, the contact information of and/or the first code of the first terminal 12*a* via the second database 14*b*. The first terminal 12*a* may access the second information of, the second code of and/or the contact information of the second terminal 12*b* to connect to, to communicate with, to access, to identify, to determine and/or to recognize the second terminal 12*b*. Still further, the second terminal 12*b* may access the first information of, the first code of and/or the contact information of the first terminal 12*a* to connect to, to communicate with, to access, to identify, to determine and/or to recognize the first terminal 12*a*. As a result, the first terminal 12*a* and/or the second terminal 12*b* may identify, may determine and/or may recognize the codec capabilities of, the codec preferences of and/or the intentions of the second terminal 12*b* and/or the first terminal 12*a*, respectively, via the information stored in the first database 14*a* and/or the second database 14*b*, respectively.

As illustrated in a table in FIG. 4, the first terminal 12*a* and/or the second terminal 12*b* in the system 10 may utilize one or more indices of a predefined table to represent the codec capabilities of and/or the codec preferences of the first terminal 12*a* and/or the second terminal 12*b* and/or other codec and multiplex configuration information for transmitting and/or for transferring data between the first terminal 12*a* and/or the second terminal 12*b*. The transmission of media and/or other data using the indices and information of the predefined table may postpone or may eliminate the requirement of receiving, of processing and/or of determining the capability information, the preference information and/or the configuration information via the control/transmission messages 30. Each codec represented in the table in FIG. 4 may have, for example, a corresponding logical channel number, a multiplexing code and/or a multiplex table entry. Each codec in the table in FIG. 4 may correspond to and/or may be assigned a coding standard, such as, for example, an H.245 control standard, an H.263 standard, an H.264 standard, a moving picture experts group four (hereinafter "MPEG-4") standard, an adaptive multi-rate (hereinafter "AMR") standard, an AMR wide-band (hereinafter "AMR-WB") standard and/or an accelerated control negotiation protocol. As illustrated in the table in FIG. 4, the coding standard for the H.245 control codec, the AMR codec, the H.263 codec, the MPEG-4 codec, the H.264 codec, the AMR-WB codec and/or the accelerated control negotiation protocol may correspond to, may be associated with and/or may be assigned multiplex table entries of 0, 1, 2, 3, 4, 5 and/or 6, respectively. Each codec in the table in FIG. 4 may be utilized by the system 10 to establish a pre-defined, pre-negotiated phantom channel (hereinafter "phantom channel") for transmitting the data between the first terminal 12*a* and the second terminal 12*b*. It should be understood that the coding standard may be any coding standard as known to one of ordinary skill in the art. Moreover, the codecs, indices, multiplex settings, configurations and other information associated with the table in FIG. 4 may be modified, and the table may be expanded to include additional codecs, indices, multiplex settings, configurations and the like. The present invention should not be limited to a specific embodiment of the table in FIG. 4.

The codecs in the table in FIG. 4 may have associated codec configuration information and/or H.223 configuration information. The codec configuration of the AMR codec may have, for example, a maximum bit rate of 12.2 kbit/s. The H.223 configuration of the AMR codec may have, for example, a maximum AL-SDU-Frames equal of one. The H.223 configuration of the AMR codec may be, for example, an adaptation layer type of AL2 with sequence numbers. Moreover, the H.223 configuration for the AMR codec may be, for example, non-segmentable and/or the like.

The codec configuration of the H.263 codec may support, for example, a Quarter Common Intermediate Format (hereinafter "QCIF") and/or the like. The codec configuration of the H.263 codec may have, for example, a QCIF Minimum Picture Interval (hereinafter "MPI") of two units which may be expressed in units of, for example, a 1/30 of a second. Additionally, the codec configuration of the H.263 codec may have, for example, a maximum bit rate of sixty-four kilobits/second. Further, the codec configuration of the H.263 codec may conform to H.263 baseline and may have, for example, parameters for an unrestricted vector, an arithmetic coding, an advanced prediction, PB-frames and/or a temporal spatial tradeoff capability which may be equal to false.

The codec configuration of the MPEG-4 codec may support, for example, the QCIF and/or the like. Further, the codec configuration of the MPEG-4 codec may have, for example, a maximum bite rate of sixty-four kilobits/second. Still further, the codec configuration of the MPEG-4 codec may have, for example, a profile and/or a level indication which may be set to eight. Moreover, the codec configuration of the MPEG-4 codec may have, for example, an object identification which may be set to one. Furthermore, the codec configuration of the MPEG-4 codec may have, for example, decoder configuration information as follows: "00-00-01-b0-00-00-01-b5-09-00-00-01-20-00-84-5d-4c-28-2c-20-90-a2-8f". Additionally, the H.223 configuration of the MPEG-4 codec may have, for example, control field octets which may be set to two octets and/or a send buffer size of one-thousand and twenty-four bytes.

The H.223 configuration of the H.264 codec may have, for example, control field octets which may be set to two octets. Further, the H.223 configuration of the H.264 codec may have, for example, a send buffer size of one-thousand and twenty-four bytes. The H.223 configuration of the AMR-WB codec may have, for example, an adaptation layer type of AL2 with sequence numbers. Moreover, the H.223 configuration of the AMR-WB codec may be, for example, non-segmentable and/or the like.

As illustrated in FIG. 1, the first terminal 12*a* and/or the second terminal 12*b* may communicate via the control/transmission message 30 via one or more channels of the network 16. The control/transmission message 30 may contain the codec capabilities, the codec preferences and/or the intentions of the first terminal 12*a* and/or the second terminal 12*b*. The control/transmission message 30 may transmit, may transfer and/or may send the codec capabilities of, the codec preferences of and/or the intent information of the first terminal 12*a* and/or the second terminal 12*b* between the first terminal 12*a* and the second terminal 12*b*. The control/transmission message 30 may have the media and/or other data which may be formatted and/or may be coded in the first codec for transmission between the first terminal 12*a* and the second terminal 12*b*. Further, the control/transmission message 30 may transmit, may transfer and/or may send the contact information and/or the codes of the first terminal 12a and/or the second terminal 12b between the first terminal 12a and the second terminal 12b. Alternatively, the contact information and/or the codes may be transferred, may be sent, may be transmitted, and/or may be exchanged by other means between the first terminal 12a and the second terminal 12b. For example, the user of terminal 12a may obtain the name and the telephone number associated with the user of terminal 12b, and may choose to manually enter such information into a contacts database accessible to terminal 12a. The name and the telephone number obtained may then be used by an embodiment of the present invention as the contact information and the code associated with terminal 12b. The present invention should not be deemed as limited to a specific embodiment of a means of discovering, of obtaining, of exchanging, of entering and/or of recording the contact information and/or the codes.

To establish a session and/or a call between the first terminal 12a and the second terminal 12b, the first terminal 12a may be capable of identifying, of discovering, and/or of determining the contact information and/or the codes associated with the second terminal 12b. In an embodiment, the user of the first terminal 12a may initiate a call to the second terminal 12b by manually entering the code associated with the second terminal 12b, or by choosing and/or by identifying the contact information associated with the second terminal 12b in a database accessible to the first terminal 12a. In another embodiment, the second terminal 12b may initiate a call to the first terminal 12a, and the first terminal 12a may be able to recognize, to receive, to determine, and/or to identify the code associated with the second terminal 12b using a caller identification service which may be provided by the network 16. The present invention should not be limited to a specific embodiment of a means of identification of the contact information and/or the codes associated with terminals 12a and/or 12b.

The first terminal 12a may use the contact information and/or the codes associated with the second terminal 12b to access and/or to retrieve the information associated with the second terminal 12b from the database 14a. The information may have the capabilities of, the preferences of, the intents of, and/or the successes and/or the failures of previous codec transmissions to the second terminal 12b. The first terminal 12a may use the information retrieved from the database 14a to select, to determine, and/or to choose a first codec for transmitting media and/or other data from the first terminal 12a to the second terminal 12b. The first codec may be selected from the codecs and/or from the information defined in the table of FIG. 4.

Alternatively, the first terminal 12a may be incapable of identifying, of discovering, and/or of determining the contact information and/or the codes associated with terminal 12b, or the first terminal 12a may be unable to access and/or to retrieve information associated with the second terminal 12b. The first terminal 12a may select, may determine, and/or may choose the first codec for transmitting the media and/or other data from the first terminal 12a to the second terminal 12b without a benefit of the information regarding the capabilities of, the preferences of, the intents of, or the successes or the failures of previous codec transmission attempts to the second terminal 12b. In an embodiment, the first terminal 12a may have a default codec to use for the first codec if the information about the second terminal 12b cannot be found and/or cannot be retrieved. The first codec may be selected from the codecs and the information defined in the table of FIG. 4.

The control/transmission message 30 may be transferred, may be transmitted, and/or may be exchanged between the first terminal 12a and the second terminal 12b via the network 16. The first terminal 12a may transmit and/or may send control/transmission messages 30 containing the media and/or other data to the second terminal 12b. The first terminal 12a may receive, may accept and/or may process the control/transmission message 30 from the second terminal 12b. The control/transmission message 30 received by the first terminal 12a may indicate the codec capabilities of, the codec preferences of and/or the intents of the second terminal 12b. As a result, the first terminal 12a may determine whether or not the first codec used to transmit the media and/or other data to the second terminal 12b is acceptable by the second terminal 12b.

The second terminal 12b may be capable of receiving, of accepting, of processing and/or of displaying the media and/or the other data in the first codec. As a result, the call setup time for transmitting the data between the first terminal 12a and the second terminal 12b may be minimized by and/or may be reduced by transmitting, by transferring and/or by sending the data in the first codec upon establishment of the bearer connection without an exchange of the codec capabilities, the codec preferences and/or the intents between the first terminal 12a and the second terminal 12b.

Alternatively, the second terminal 12b may be incapable of processing, of receiving, of accepting, of rendering and/or of displaying the media and/or other data transmitted and/or sent in the first codec from the first terminal 12a via the network 16. The second terminal 12b may transmit the codec capabilities of, the codec preferences of and/or the intent of the second terminal 12b to the first terminal 12a via the control/transmission message 30 and/or the network 16. The first terminal 12a may use the information from the received control/transmission messages 30 to determine and/or to identify whether the second terminal 12b is incapable of processing, of receiving, of accepting, of rendering, and/or of displaying the media and/or other data in the first codec. The first terminal 12a may identify and/or may determine a second codec which may be acceptable by, may be accessible by and/or may be preferred by the second terminal 12b for receiving, for processing, for rendering and/or for displaying the media and/or other data transmitted and/or transferred from the first terminal 12a and the second terminal 12b. The second codec may be selected from the codecs and/or from the information defined in the table of FIG. 4.

The first terminal 12a may negotiate and/or may switch from transmitting the media and/or other data in the first codec to transmitting the media and/or other data in the second codec from the first terminal 12a to the second terminal 12b via the network 16. The second terminal 12b may receive, may accept, may process, may render and/or may display the media and/or other data in the second codec. A resulting fallback negotiation between the first terminal 12a and the second terminal 12b may allow the media and/or other data to be transmitted and/or to be sent from the first terminal 12a to the second terminal 12b with only a half of a round trip nominal delay after the establishment of the bearer.

The media and/or other data which may be sent without, for example, an H.245 logical channel negotiation may be transmitted and/or may be transferred between the first terminal 12a and the second terminal 12b via at least one phantom channel over the network 16. Each phantom channel of the system 10 may be a data transmission channel for connecting the first terminal 12a and the second terminal 12b via the network 16 for transmitting, for sending and/or for transferring the media and/or other data between the first terminal 12a and the second terminal 12b. Each phantom channel of the system 10 may use a pre-defined codec along with the associated multiplex information, configuration information, and/or other associated information taken from the table of FIG. 4. Each phantom channel may be detected by, may be established by and/or may be opened with the second terminal 12b which may be receiving and/or may be processing the data from the first terminal 12a. Each phantom channel may terminate upon the establishment of an H.245-negotiated logical channel for the same and/or for a similar type of the media and/or other data. In an embodiment, the first terminal 12a may establish a phantom channel which may transmit and/or may transfer audio data from the first terminal 12a to the second terminal 12b. The phantom channel may terminate upon the establishment of the first H.245-negotiated logical channel which may transmit and/or may transfer audio data from the first terminal 12a to the second terminal 12b.

The first terminal 12a and/or the second terminal 12b may establish at least one phantom channel and/or may proceed through the H.245 call setup procedures. Each phantom channel may be replaced by an open logical channel (hereinafter "OLC") which may be based on, may be associated with and/or may correspond to the H.245 call setup. The OLC may be for example, an audio logical channel, a visual logical channel and/or a data logical channel for transmitting the data between the first terminal 12a and the second terminal 12b. Alternatively, each phantom channel may not be replaced to be used for transmitting and/or for transferring media and/or other data between the first terminal 12a and the second terminal 12b for the duration of the session and/or the call. As a result, the system 10 may avoid the H.245 logical channel negotiation between the first terminal 12a and the second terminal 12b. It should be understood that the OLC which may be used to replace a phantom channel may be any logical channel as known to one of ordinary skill in the art.

The second information, the contact information and/or the codes of the second terminal 12b which may be stored in the first terminal 12a and/or the first database 14a may be updated, may be altered and/or may be modified based on the information sent from the second terminal 12b and received by the first terminal 12a, and/or by information learned by the first terminal 12a in the process of setting up a session and/or call with the second terminal 12b. The information may include the contact information of, the codes of, the second information of, the capabilities of, the preferences of, the intents of, and/or the success or the failure of the codec transmissions to the second terminal 12b.

The first terminal 12a may access the second information of, the contact information of, and/or the codes of the second terminal 12b to determine, to identify and/or to recognize whether the first codec or the second codec may be acceptable by the second terminal 12b for receiving, for processing, for rendering and/or for displaying the data in the first codec or in the second codec. As a result, the first terminal 12a may transmit and/or may transfer the media and/or other data in the first codec or in the second codec based on the second information of, the contact information and/or the codes of the second terminal 12b. The first terminal 12a and the second terminal 12b may exchange the data in the first codec or in the second codec based on the contact information of the first terminal 12a and the second terminal 12b via one or more phantom channels of the network 16. As a result, the system 10 may successfully transmit the data from the first terminal 12a to the second terminal 12b via the information in the first database 14a, the second information of the second terminal 12b, the contact information of the second terminal 12b and/or the codes of the second terminal 12b.

The data may be encoded with, may be formed with and/or may have standard stuffing blocks for transmitting the data via the network 16 between the first terminal 12a and the second terminal 12b. The standard stuffing blocks may be interleaved with the data in the first codec from the control/transmission message 30 for transmitting between and/or for exchanging between the first terminal 12a and the second terminal 12b via at least one phantom channel of the network 16. As a result, a legacy terminal, for example, may synchronize with the standard stuffing blocks and/or may discard the data in the first codec. In an embodiment, a legacy terminal may be any terminal which may not be capable of receiving media and/or other data via phantom channels, or any terminal which requires channels to be negotiated and/or set up using H.245 open logical channel signaling or the like.

The first terminal 12a may recognize and/or may determine that the second terminal 12b may be a legacy terminal. In an embodiment, the first terminal 12a may examine the capabilities and/or the intents which may be sent from the second terminal 12b and/or may be received by the first terminal 12a to determine whether the second terminal 12b is a legacy terminal. As a second example, the first terminal 12a may examine the stuffing pattern and/or a presence or an absence of phantom channel data in the control/transmission messages 30 which may be sent by the second terminal 12b and may be received by the first terminal 12a. The present invention should not be limited to a specific embodiment of a means of a legacy terminal recognition and/or a legacy terminal detection. To recognize and/or to determine whether the second terminal 12b is a legacy terminal, the first terminal 12a may terminate and/or may discontinue the transmission of phantom channel data using the first codec and/or the second codec, and may revert to legacy signaling which may be recognized by, may be compatible with, and/or may be acceptable to the second terminal 12b.

The first terminal 12a and/or the second terminal 12b may use a signaling extension of standard control signaling to indicate support for the sending of and/or for receiving media and/or other data using phantom channels over the network 16. The signaling extensions may be used to indicate support for sending and/or for receiving phantom channels which may use the codec indices and the associated codecs, multiplex information and/or configuration information defined in the table of FIG. 4. The first terminal 12a may use the indications sent from the second terminal 12b and may be received by the first terminal 12a to determine whether the second terminal 12b is capable of receiving media and/or other data sent using the first codec and/or the second codec on phantom channels over the network 16.

In an embodiment, the second terminal 12b may use extensions of the H.245 terminal capability set (hereinafter, "TCS") message to indicate to the first terminal 12a whether the second terminal 12b is capable of receiving media and/or other data on phantom channels using a subset of the codecs defined in the table of FIG. 4. The first terminal 12a may use the information in the extended TCS message which may be received from the second terminal 12b to determine and/or to detect whether the first codec used to transmit and/or to transfer data from the first terminal 12a to the second terminal 12b may be acceptable to and/or may be supported by the second terminal 12b. The first terminal 12a may determine and/or may detect whether to change, to transfer and/or to switch to a second codec which may be acceptable and/or may be supported by the second terminal 12b.

In yet another embodiment, the first terminal 12a may choose to change, to transfer and/or to switch to the second codec using an OLC negotiation, such as, for example, an H.245 open logical channel. Negotiation of the H.245 OLC may utilize WNSRP protocol and/or other improvements which may provide speed advantages over a standard H.245 OLC negotiation. It should be understood that the open logical channel may be any open logical channel as known to one of ordinary skill in the art.

FIGS. 2A and 2B illustrate a time-line for connection of the first terminal 12a and the second terminal 12b via a video phantom channel 32 and/or an audio phantom channel 34. The first terminal 12a may begin sending, transferring and/or transmitting the data which may be interleaved with the standard stuffing block at the establishment of the bearer connection at point A in FIGS. 2A and 2B. The video phantom channel 32 and/or the audio phantom channel 34 may be acceptable to the second terminal 12b for receiving, for accepting, for processing, for rendering and/or for displaying the data. As a result, the video phantom channel 32 and/or the audio phantom channel 34 between the first terminal 12a and the second terminal 12b may be established to transmit, to transfer and/or to exchange the data between the first terminal 12a and the second terminal 12b. A level setup between the first terminal 12a and the second terminal 12b may be completed, may be established and/or may be executed at point B in FIGS. 2A and 2B. An exchange of the TCS message and/or the MSD message between the first terminal 12a and the second terminal 12b may be completed, may be established and/or may be executed at point C in FIGS. 2A and 2B.

The video phantom channel 32 and/or the audio phantom channel 34 may be utilized for transmitting the data from the first terminal 12a to the second terminal 12b. The second terminal 12b may execute, may complete and/or may negotiate the OLC at point D in FIGS. 2A and 2B. As a result, the video phantom channel 32 and/or the audio phantom channel 34 may be replaced with a negotiated video channel 36 and/or a negotiated audio channel 38 at point D as illustrated in FIG. 2A. Alternatively, the second terminal 12b may not execute, may not complete and/or may not negotiate the OLC. As a result, the video phantom channel 32 and/or the audio phantom channel 34 may be used to transmit and/or to transfer the data from the first terminal 12a to the second terminal 12b for the duration of the session and/or call as illustrated in FIG. 2B.

The first terminal 12a and/or the second terminal 12b may support and/or may accept the first codec and/or may begin transmitting the data in the first codec via, for example, a communication transmission or a communication transmission with an optional header. The communication transmission may be, for example, H.223 multiplex level 2 and/or the like. The present invention should not be deemed as limited to a specific embodiment of the communication transmission.

The optional header may be information which may correspond to, may be based on and/or may be associated with handling of, processing of, rendering of and/or displaying of the data by the first terminal 12a and/or the second terminal 12b. The first terminal 12a and/or the second terminal 12b may be capable of receiving, of accepting, of processing and/or of executing the communication transmission and/or the communication transmission with the optional header. Alternatively, the first terminal 12a and/or the second terminal 12b may be incapable of processing and/or of accepting the communication transmission with the optional header. As a result, the first terminal 12a and/or the second terminal 12b may discontinue the use of and/or the transmission of the optional header. In an embodiment of the present invention, a terminal which is incapable of receiving and/or of processing the optional header may parse an audio/video (hereinafter "A/V") multiplexing (hereinafter "Mux") protocol data unit (hereinafter "PDU") to remove the optional header from the communication transmission so that the media and/or other data carried in the payload of the A/V Mux PDU may still be received, may be utilized, may be displayed and/or may be rendered by the receiving terminal.

As illustrated in FIG. 3, the first terminal 12a which may support and/or may accept the data in the first codec may transmit the A/V Mux PDU 40 to the second terminal 12b via the network 16. A pattern of stuffing blocks 39 may be interleaved with the A/V Mux PDU 40 for transmitting and/or for transferring from the first terminal 12a to the second terminal 12b. The pattern of stuffing blocks 39 may have, for example, a standard stuffing 42 and/or a modified stuffing 44. The standard stuffing 42 may be, for example, a stuffing sequence for the communication transmission and/or the communication transmission with the optional header. The standard stuffing sequence 42 may be aligned, may be formatted and/or may be formed consecutively in a set which may have, for example, twenty or more repeated units of a standard stuffing sub-sequence (not shown). The set of the standard stuffing sequence 42 may be transmitted from the first terminal 12a to the second terminal 12b via the network 16. The modified stuffing 44 may replace the Mux Code of the standard stuffing with a value corresponding to at least one of the phantom channels 32, 34 with a pattern such as, for example, [A] 46, [V], 48, [A], 46 [V], 48. A set of at least four consecutive units of the modified stuffing 44 may be sequenced, may be formed, may be aligned and/or may be transmitted from the first terminal 12a to the second terminal 12b. The A/V Mux PDU 40 may be the data which may be transmitted from the first terminal 12a to the second terminal 12b via at least one of the phantom channels 32, 34. The A/V Mux PDU 40 may be transmitted via the communication transmission and/or the communication transmission with the optional header. An initial repetition rate may be a first duration of time between stuffing blocks and may not be more than a second duration of time, such as, for example, two-hundred mS. A level setup may be completed and/or may be executed for at least one of the phantom channels 32, 34 to be detected, to be opened and/or to be established by the second terminal 12b. As a result, the first terminal 12a may terminate a transmission of a regular stuffing block and/or may initiate a transmission of the A/V Mux PDU 40 from at least one of the phantom channels 32, 34 and/or from the OLC. The present invention should not be deemed as limited to a specific embodiment of the second duration of time of the system 10.

The first terminal 12a may be operating in accordance with and/or may comply with the default options as set forth above. The phantom channels 32, 34 may be established and/or may be opened between the first terminal 12a and the second terminal 12b. As a result, the first terminal 12a may use, may access and/or may select H.245 OLC procedures to establish and/or to open one or more regular channels between the first terminal 12a and the second terminal 12b via the network 16. As a result, the phantom channels 32, 34 between the terminals 12a, 12b may be terminated by, may be closed by and/or may be disconnected by the first terminal 12a. To allow for an unambiguous transition by the second terminal 12b, the first terminal 12a may establish and/or may open H.245-negotiated logical channel numbers and/or a multiplex table which may not interrupt and/or may not conflict with the logical channel numbers and multiplex table entries utilized by the phantom channels 32, 34. The first terminal 12a may reserve one multiplex table entry for each of the phantom channels 32, 34. The regular channels between the first terminal 12a and the second terminal 12b may be established and/or may be opened via the network 16. As a result, the first terminal 12a may update, may modify and/or may alter a Mux table with a regular H.245 MES procedure utilizing previously reserved table entries.

The first terminal 12a may delay transmission and/or transfer of the media and/or other data in the first codec until receipt of the codec capabilities, the codec preferences and/or the intents of the second terminal 12b. The first terminal 12a may select the first codec using information from the received capabilities, preferences, and/or intents of the second terminal 12b in order to ensure that the media and/or other data transmitted and/or transferred in the first codec may be acceptable to the second terminal 12b.

The first terminal 12a may be capable of detecting, of determining and/or of identifying whether the data in the first codec may be received by, may be accepted by, may be processed by, may be rendered by and/or may be displayed by the second terminal 12b. The first terminal 12a may detect, may identify and/or may determine the Modified stuffing sequences and/or the A/V Mux PDU 40 of the phantom channels 32, 34 to determine and/or to identify whether the data in the first codec may be acceptable and/or may be receivable by the second terminal 12b. One or more synchronization techniques, such as, for example, a correlation search on incoming stuffing patterns may be used to determine whether the second terminal 12b may accept, may process and/or may render the data in the first codec. After the phantom channels 32, 34 may be detected by the second terminal 12b, the second terminal 12b may begin to decode, to accept, to receive, to process, to render and/or to display the data in the first codec.

The second terminal 12b may transmit the codec capability object as part of a control/transmission message 30 to the first terminal 12a via the network 16. The codec capability object may be carried via signaling extensions to the H.245 TCS message. The codec capability object may indicate and/or may determine which codecs in the table of FIG. 4 may be acceptable and/or may be receivable by the second terminal 12b. The first terminal 12a may utilize the codec capability object and/or other information to determine that the second terminal 12b may be incapable of processing, of accepting, of receiving, of rendering and/or of displaying the data in the first codec. Further, the first terminal 12a may use the presence or the absence of the codec capability object to determine whether the second terminal 12b may be capable or may be incapable of processing, of accepting and/or of receiving media and/or other data transmitted and/or transferred via the phantom channels. As a result, the first terminal 12a may terminate and/or may close a transmission of the phantom channels 32, 34 for reverting to the H.245 OLC negotiation. The first terminal 12a may receive and/or may process the H.245 TCS message and/or other control/transmission message 30 without the codec capability object and/or without detecting and/or identifying the Modified stuffing sequence 44 which may indicate that the second terminal 12b may not support the data in the first codec and/or may not support the establishment of the phantom channels 32, 34. As a result, the first terminal 12a may identify and/or may determine the codecs in the table of FIG. 4 which may be acceptable and/or may be receivable by the second terminal 12b.

The system 10 may be compatible with a legacy terminal (not shown in the drawings) which may not support the establishment of the phantom channels 32, 34. The regular stuffing component to the stuffing block may be detectable by the legacy terminal which may be supporting an identical H.223 mode, such as, for example, communication or communication with the optional header. The legacy terminal may detect the stuffing pattern and/or may send the communication transmission to the first terminal 12a. Further, the second terminal 12b may transmit a control/transmission message 30 to the first terminal 12a which does not indicate support for receiving, for accepting, and/or for processing the media and/or other data sent via the phantom channels. As a result, the first terminal 12a may detect and/or may identify that the second terminal 12b is a legacy terminal. The first terminal 12a may terminate the phantom channels 32, 34 used to transmit and/or to transfer the media and/or other data to the second terminal 12b. The first terminal may revert to legacy signaling which may include standard H.245 procedures for capability exchange, for master slave determination, for opening logical channels, for establishing a multiplex table, and/or the like.

Alternatively, the legacy terminal may not detect, may not recognize and/or may not identify the standard stuffing of the data which may be transmitted from and/or may be received from the first terminal 12a via the network 16. As a result, the second terminal 12b may not transmit control/transmission messages 30 to the first terminal 12a. The first terminal 12a may use a timeout period to detect that the second terminal 12b may not be capable of detecting the standard stuffing, may not be capable of receiving phantom channel data and/or may not be capable of receiving, of accepting, of processing, of rendering and/or of displaying the data in the first codec. The first terminal 12a may terminate a transmission of the phantom channels 32, 34 used to transmit and/or transfer media and/or other data to the second terminal 12b. The first terminal may revert to legacy signaling which may include standard H.245 procedures for capability exchange, for master slave determination, for opening logical channels, for establishing a multiplex table and/or the like.

The first terminal 12a may detect whether the stuffing received from the second terminal 12b is at a lower level than the communication level associated with the support for sending and/or for receiving the media and/or other data via phantom channels. Detection of such stuffing may indicate that the second terminal 12b is a legacy terminal and that the second terminal 12b may be incapable of supporting, of receiving, of accepting and/or of displaying the media and/or other data via phantom channels. The first terminal 12a may terminate transmission of phantom channels 32, 34 and/or may switch to the lower level of transmission in order to exchange legacy signaling with and/or to set up a session and/or call with the second terminal 12b.

In an embodiment, the first terminal 12a may transmit an audio signal and/or a video signal to the second terminal 12b which may be coded in the AMR codec and/or the MPEG-4 codec, respectively. The second terminal 12b may support and/or may be capable of receiving, of processing, of accepting, of rendering and/or of displaying the AMR codec and/or the MPEG-4 codec. As a result, an audio channel and/or a video channel between the terminals 12a, 12b to transmit the audio phantom signal and/or the video phantom signal to the second terminal 12b may be established via the network 16.

In another embodiment, the first terminal 12a may transmit an audio signal and/or a video signal which may be coded in the AMR codec and/or the H.264 codec, respectively. The second terminal 12b may support, may receive, may accept, may process, may render and/or may display the AMR codec for the audio signal but may be incapable of supporting the H.264 codec for the video signal. As a result, the audio phantom channel between the first terminal 12a and the second terminal 12b for transmitting the audio signal to the second terminal 12b may be established via the network 16. The video phantom channel for transmitting the video signal between the first terminal 12a and the second terminal 12b may not be established. A half round trip delay may occur as the first terminal 12a may receive the H.245 TCS message from the second terminal 12b, may detect whether the second terminal 12b is incapable of supporting, of receiving, of accepting, of processing and/or of rendering the H.264 codec and may switch the outgoing video signal from transmitting in the H.264 codec to transmitting in the MPEG-4 codec. As a result, a half round trip delay to establish video transmission may occur in a video direction from the first terminal 12a to the second terminal 12b. A video phantom channel transmission from the second terminal 12b to the first terminal 12a may be established immediately without such a delay for transmitting and/or for transferring the video signal from the second terminal 12b to the first terminal 12a.

In yet another embodiment, the first terminal 12a may transmit and/or may send the data in the communication transmission with the optional header for stuffing. Alternatively, the second terminal 12b may transmit the data in the communication transmission without the optional header. The first terminal 12a and the second terminal 12b may parse the initial A/V Mux PDU 40 for receiving the data via the communication transmission. As a result, the video phantom channel 32 and/or the audio phantom channel 34 may be established in one or more directions between the first terminal 12a and the second terminal 12b. Upon receipt of control/transmission messages 30 from the second terminal 12b, the first terminal 12a may identify and/or may determine that the second terminal 12b may not be capable of accepting, of receiving and/or of processing the communication transmission with the optional header. As a result, the first terminal 12a may modify and/or may change the communication transmission to remove the optional header for transmitting the data to the second terminal 12b. A negotiation of the optional header may not affect, may not delay and/or may not interrupt the transmission and/or the transfer of the media and/or other data using the phantom channels between the first terminal 12a and the second terminal 12b.

In another embodiment, the first terminal 12a may transmit an audio signal and/or a video signal which may be coded in, for example, the AMR codec and/or the MPEG-4 codec, respectively. The second terminal 12b may support receipt of, processing of and/or rendering of the data in the AMR codec and/or the MPEG-4 codec. As a result, an audio phantom channel 32 and/or a video phantom channel 34 for transmitting the audio signal and/or the video signal to the second terminal 12b may be established and/or may be opened via the network 16. The first terminal 12a may select and/or may determine to replace the video phantom channel 32 and/or the audio phantom channel 34 via an OLC negotiation message, such as a H.245 OLC negotiation message. The OLC negotiation message may open and/or may establish the OLC between the first terminal 12a and the second terminal 12b to replace and/or to terminate the video phantom channel 32 and/or the audio phantom channel 34. It should be understood that the OLC negotiation message may be any OLC negotiation message as known to one of ordinary skill in the art.

In yet another embodiment, the second terminal 12b may begin transmission of the data to the first terminal 12a from the second terminal 12b via one or more of the phantom channels 32, 34. The first terminal 12a may be a legacy terminal which may not support, may not process and/or may not recognize one or more of the phantom channels 32, 34. The first terminal 12a may send and/or may transmit the TCS message and/or the MSD message to the second terminal 12b. The second terminal 12b may determine, may identify and/or may recognize that the first terminal 12a may not be capable of supporting the establishment of one or more phantom channels 32, 34 between the first terminal 12a and/or the second terminal 12b. As a result, the second terminal 12b may terminate and/or may end a transmission of the data to the first terminal 12a via one or more of the phantom channels 32, 34. The first terminal 12a and the second 12b may exchange the TCS message and/or the MSD message to complete and/or to execute the H.245 OLC negotiation. The retransmission protocol WNSRP and/or the like may be used by the first terminal 12a and/or the second terminal 12b for the H.245 OLC negotiation. As a result, the negotiated H.245 OLC may be established and/or may be opened between the first terminal 12a and the second terminal 12b via the network 16.

The system 10 may focus on, may be based on, may correspond to, may identify and/or may recognize a flow and/or a transmission of data primarily in a first direction, such as, for example from the first terminal 12a to the second terminal 12b. Further, the data may flow and/or may be transmitted in a second direction, such as, for example, from the second terminal 12b to the first terminal 12a. Moreover, the data may flow and/or may be transmitted in the first direction and/or the second direction for exchanging the data between the first terminal 12a and the second terminal 12b. It should be understood that the data may flow and/or may be transmitted in a bi-directional data flow which may be a typical application of the system 10 for the first terminal 12a and the second terminal 12b.

In yet another embodiment, the user of the first terminal 12a may initiate a call to the user of the second terminal 12b. The user of the first terminal 12a may select the contact information associated with the second terminal 12b from a contacts database and/or a related application which may be connected to and/or may be residing on the first terminal 12a. The first terminal 12a may examine the database 14a to detect, to find, to access, and/or to retrieve information relevant to the codec capabilities and/or the codec preferences of the second terminal 12b. The first terminal 12a may use information retrieved from the database 14a to determine whether the second terminal 12b may be capable of receiving, of accepting, of processing, of displaying and/or of rendering audio and/or video data sent using the AMR-WB codec and/or the H.264 codec, respectively. The first terminal 12a may initiate the call to the second terminal 12b, may complete procedures to establish the bearer between the first terminal 12a and the second terminal 12b and/or may begin transmission of the audio phantom channel 32 and/or the video phantom channel 34 using the AMR-WB and/or H.264 codecs, respectively. The second terminal 12b may accept, may process, may display, and/or may render the audio data and/or the video data received via the phantom channels 32, 34. The phantom channels may be established between the first terminal 12a and the second terminal 12b with minimal delay and/or without a need for changing, for switching and/or for replacing the initial codecs using a fallback negotiation.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for transmitting data wherein the data is at least one of audio signals, video signals and accelerated control negotiation protocol signals, the system comprising:
 a network which transmits the data;
 a first terminal connected to the network wherein the first terminal transmits the data via the network;

a second terminal connected to the network wherein the second terminal communicates with the first terminal via the network and further wherein contact information is associated with the second terminal; and a database accessible by the first terminal wherein the database has a plurality of codecs wherein the database stores an association of the contact information of the second terminal with a first codec of the plurality of codecs wherein the first terminal uses the contact information identification to select the first codec from the database and transmits the data encoded in the first codec to the second terminal via the network after using the contact information to select the first codec from the database.

2. The system of claim 1 wherein the second terminal displays the data encoded in the first codec.

3. The system of claim 1 further comprising:
a video telephony session in which the first terminal and the second terminal participate wherein the data encoded in the first codec represents at least one of audio communication and video communication from the first terminal to the second terminal in the video telephony session.

4. The system of claim 1 wherein the data encoded in the first codec is an ASN.1 based protocol stream for call negotiation.

5. The system of claim 1 wherein the first terminal uses information entered by a user of the first terminal to determine the contact information of the second terminal.

6. The system of claim 1 wherein the second terminal is a mobile telephone associated with a mobile telephone number and further wherein the contact information includes the mobile telephone number.

7. The system of claim 1 wherein the first terminal uses a caller identification service provided by the network to determine the contact information of the second terminal.

8. The system of claim 1 further comprising:
decoding capabilities sent in a transmission from the second terminal to the first terminal wherein the first terminal uses the decoding capabilities to determine that the data encoded in the first codec does not match the decoding capabilities of the second terminal wherein the first terminal discontinues transmittal of the data encoded in the first codec wherein the first terminal selects a second codec based on the decoding capabilities of the second terminal wherein the first terminal transmits the data encoded in the second codec to the second terminal using the network after selecting the second codec and further wherein the first terminal stores an association of the contact information of the second terminal with the second codec in the database.

9. The system of claim 1 wherein the network is wireless.

10. A method for transmitting data the method comprising the steps of:
connecting a first terminal and a second terminal to a network wherein the first terminal and the second terminal communicate using the network;
accepting user input on the first terminal wherein the user input identifies the second terminal and instructs the first terminal to initiate a current call to the second terminal wherein the current call involves at least one of audio communication and video communication between the first terminal and the second terminal;
establishing a connection between the first terminal and the second terminal over the network wherein the connection is established in response to the user input instructing the first terminal to initiate the current call;
selecting a first codec from a plurality of codecs wherein the first terminal selects the first codec based on a stored association between the second terminal and the first codec; and
transmitting the data from the first terminal to the second terminal using the network wherein the data is at least one of audio signals and video signals used for communication in the current call wherein the data is encoded in the first codec and further wherein the first terminal does not receive codec capability information from the second terminal from acceptance of the user input on the first terminal to initiation of transmission of the data from the first terminal to the second terminal.

11. The method of claim 10 wherein the user input identifies the second terminal based on contact information stored in a contacts database associated with the first terminal.

12. The method of claim 10 wherein the user input identifies the second terminal based on entering a telephone number associated with the second terminal.

13. The method of claim 10 wherein the first terminal creates the stored association between the second terminal and the first codec based on capability information sent from the second terminal to the first terminal during a previous call between the first terminal and the second terminal and further wherein the previous call ended before the acceptance of the user input instructing the first terminal to initiate the current call.

14. The method of claim 10 wherein the first terminal is a mobile telephone with attached electronic memory and further wherein the stored association between the second terminal and the first codec is stored in a database in the attached electronic memory.

15. The method of claim 10 further comprising the step of:
receiving codec capability information wherein the first terminal receives the codec capability information from the second terminal after the initiation of transmission of the data encoded in the first codec from the first terminal to the second terminal and further wherein the first terminal determines that the second terminal is not capable of decoding the data encoded in the first codec based on the codec capability information wherein the first terminal stops sending the data encoded in the first codec and starts sending the data encoded in a second codec in response to receiving the codec capability information.

16. The method of claim 10 further comprising the step of:
receiving codec capability information wherein the first terminal receives codec capability information from the second terminal after the initiation of transmission of the data encoded in the first codec from the first terminal to the second terminal and further wherein the first terminal stores an association between the second terminal and a second codec wherein the codec capability information indicates that the second terminal is capable of decoding the data encoded in the second codec and further wherein the first terminal uses the association between the second terminal and the second codec to determine a selected codec for transmitting the data in a future call between the first terminal and the second terminal wherein the future call begins at a time after the current call ends.

17. A system for transmitting data wherein the data is at least one of audio signals, video signals and accelerated control negotiation protocol signals, the system comprising:
a network which transmits the data;
a first terminal connected to the network wherein the first terminal receives and transmits the data via the network;

a second terminal connected to the network wherein the second terminal communicates with the first terminal via the network;

a first database accessible by the first terminal wherein the database has a plurality of codecs wherein the first database stores an association of the second terminal with a first codec wherein the first terminal provides an identification of the second terminal, uses the identification to select the first codec from the first database and transmits the data encoded in the first codec to the second terminal via the network; and a channel established between the first terminal and the second terminal wherein the channel is associated with the first codec wherein the data is transmitted via the channel.

18. The system of claim 17 wherein the identification of the second terminal provided by the first terminal is based on user input accepted by the first terminal and further wherein the user input selects a contact associated with the second terminal from a contacts database accessed by the first terminal.

19. The system of claim 17 wherein the identification of the second terminal by the first terminal is based on user input accepted by the first terminal and further wherein the second terminal is a mobile telephone associated with a mobile telephone number wherein the user input identifies the mobile telephone number associated with the second terminal.

20. The system of claim 17 wherein the identification of the second terminal by the first terminal is obtained by the first terminal from a caller identification service provided by the network.

21. The system of claim 17 wherein the data is at least one of audio signals and video signals representing communication from a user of the first terminal to a user of the second terminal in a current call between the first terminal and the second terminal wherein the association of the second terminal with the first codec is based on capability information received by the first terminal during a previous call between the first terminal and the second terminal.

22. A system for transmitting data wherein the data is at least one of audio signals, video signals and accelerated control negotiation protocol signals, the system comprising:

a network which transmits the data;

a first terminal connected to the network wherein the first terminal receives and transmits the data via the network;

a second terminal connected to the network wherein the second terminal communicates with the first terminal via the network; and a first database accessible by the first terminal wherein the database has a plurality of codecs wherein the first database stores an association of the second terminal with a first codec wherein the first terminal provides an identification of the second terminal, uses the identification to select the first codec from the first database and transmits the data encoded in the first codec to the second terminal via the network wherein the first terminal receives a codec capability of the second terminal with a second codec and stores in the first database an association of the codec capability with the second terminal.

23. The system of claim 22 wherein the first terminal uses the codec capability to determine that the second terminal is incapable of decoding the data in the first codec and further wherein the first terminal discontinues transmission of the data in the first codec and begins transmitting the data in the second codec in response to receiving the codec capability.

24. The system of claim 22 wherein the first terminal is a mobile telephone having local storage and further wherein the first database is stored in the local storage of the mobile telephone.

25. The system of claim 22 wherein transmission of the data in the first codec from the first terminal to the second terminal begins before the first terminal receives the codec capability from the second terminal.

26. The system of claim 22 wherein the first terminal initiates a subsequent transmission of additional data to the second terminal after receiving the codec capability of the second terminal and further wherein the first terminal initiates the subsequent transmission by identifying the second terminal, accessing the association of the codec capability with the second terminal from the first database, and transmitting the additional data encoded in the second codec to the second terminal after accessing the association of the codec capability with the second terminal.

27. A system for transmitting data wherein the data is at least one of audio signals, video signals and accelerated control negotiation protocol signals, the system comprising:

a network which transmits the data;

a first terminal connected to the network wherein the first terminal receives and transmits the data via the network;

a second terminal connected to the network wherein the second terminal communicates with the first terminal via the network;

a plurality of codecs wherein the first terminal selects a default codec from the plurality of codecs without identifying codec capabilities of the second terminal and transmits the data encoded in the default codec to the second terminal via the network; and a database accessible by the first terminal wherein the first terminal receives a codec capability of the second terminal with a second codec and stores an association of the codec capability with the second terminal in the database.

28. The system of claim 27 wherein the first terminal initiates a communication call from the first terminal to the second terminal in response to user input on the first terminal after storage of the association of the codec capability with the second terminal in the database and further wherein the first terminal selects the second codec for use in the communication call based on the association of the codec capability with the second terminal stored in the database.

29. The system of claim 27 wherein the codec capability indicates that the second terminal is incapable of decoding the data encoded in the default codec and further wherein the first terminal discontinues sending the data encoded in the default codec and begins sending the data encoded in the second codec in response to receiving the codec capability.

30. The system of claim 27 wherein the association of the codec capability with the second terminal stored in the database associates the codec capability with contact information for a user of the second terminal.

31. A method for transmitting data, the method comprising the steps of:

connecting a first terminal and a second terminal to a network wherein the first terminal and the second terminal communicate via the network;

initiating a current call from the first terminal to the second terminal wherein the first terminal initiates the current call and further wherein the current call involves at least one of audio communication and video communication between the first terminal and the second terminal;

accepting the current call wherein the second terminal accepts the current call based on user input on the second terminal;

identifying the first terminal wherein the second terminal identifies the first terminal;

selecting a first codec from a plurality of codecs wherein the second terminal selects the first codec based on identification of the first terminal by the second terminal and based on a stored association between the first terminal and the first codec; and transmitting the data from the second terminal to the first terminal using the network wherein the data is at least one of audio signals and video signals used for communication in the current call wherein the data is encoded in the first codec and further wherein the second terminal does not receive codec capability information from the first terminal from the time of initiating the current call to the time of beginning transmitting of the data from the second terminal to the first terminal.

32. The method of claim 31 wherein the identification of the first terminal is based on a caller identification service provided by the network.

33. The method of claim 31 wherein the first terminal is a mobile telephone and further wherein the identification of the first terminal provides a mobile telephone number associated with the first terminal.

34. The method of claim 31 wherein the stored association between the first terminal and the first codec was created by the second terminal based on capability information sent from the first terminal to the second terminal during a previous call between the first terminal and the second terminal wherein the previous call ended before the second terminal accepted the current call.

35. The method of claim 31 further comprising the step of:

receiving codec capability information wherein the second terminal receives the codec capability information from the first terminal after initiating transmission of the data encoded in the first codec from the second terminal to the first terminal and further wherein the second terminal determines that the first terminal is not capable of decoding the data encoded in the first codec based on the codec capability information wherein the second terminal stops sending the data encoded in the first codec and starts sending the data encoded in a second codec in response to receiving the codec capability information.

* * * * *

UNITED STATES PATENT AND TRADEMARK OFFICE
CERTIFICATE OF CORRECTION

| | | |
|---|---|---|
| PATENT NO. | : 7,808,988 B2 | Page 1 of 1 |
| APPLICATION NO. | : 11/704054 | |
| DATED | : October 5, 2010 | |
| INVENTOR(S) | : Neff | |

It is certified that error appears in the above-identified patent and that said Letters Patent is hereby corrected as shown below:

Column 23, Claim 1, line 10 which is located at column 23, line 10: cancel "identification"

Signed and Sealed this
Eighth Day of March, 2011

David J. Kappos
*Director of the United States Patent and Trademark Office*